(12) United States Patent
Shen et al.

(10) Patent No.: US 8,510,032 B2
(45) Date of Patent: *Aug. 13, 2013

(54) METHOD AND SYSTEM FOR IMPROVING SPEECH RECOGNITION ACCURACY BY USE OF GEOGRAPHIC INFORMATION

(75) Inventors: Zhongnan Shen, Sunnyvale, CA (US);
Fuliang Weng, Mountain View, CA (US); Zhe Feng, Shanghai (CN)

(73) Assignee: Robert Bosch GmbH, Stuttgart (DE)

( * ) Notice: Subject to any disclaimer, the term of this patent is extended or adjusted under 35 U.S.C. 154(b) by 0 days.

This patent is subject to a terminal disclaimer.

(21) Appl. No.: 13/567,242

(22) Filed: Aug. 6, 2012

(65) Prior Publication Data

US 2012/0303267 A1 Nov. 29, 2012

Related U.S. Application Data

(63) Continuation of application No. 12/509,662, filed on Jul. 27, 2009, now Pat. No. 8,239,129.

(51) Int. Cl.
*G01C 21/00* (2006.01)

(52) U.S. Cl.
USPC ............ 701/400; 701/488; 701/431; 704/251

(58) Field of Classification Search
USPC .................. 701/400, 409, 418, 427, 431, 532, 701/488; 704/231, E15.001, 251; 340/995.17
See application file for complete search history.

(56) References Cited

U.S. PATENT DOCUMENTS 8,239,129 B2 * 8/2012 Shen et al. .................... 701/400

* cited by examiner

*Primary Examiner* — Gertrude Arthur Jeanglaude

(57) ABSTRACT

A method for speech recognition includes providing a source of geographical information within a vehicle. The geographical information pertains to a current location of the vehicle, a planned travel route of the vehicle, a map displayed within the vehicle, and/or a gesture marked by a user on a map. Words spoken within the vehicle are recognized by use of a speech recognition module. The recognizing is dependent upon the geographical information.

20 Claims, 4 Drawing Sheets provide a source of geographical information within a vehicle, the geographical information pertaining to a current location of the vehicle, a planned travel route of the vehicle, and/or a map displayed within the vehicle
(202)

recognize words spoken within the vehicle by use of a speech recognition module, the recognizing being dependent upon the geographical information
(204)

METHOD AND SYSTEM FOR IMPROVING SPEECH RECOGNITION ACCURACY BY USE OF GEOGRAPHIC INFORMATION

CROSS-REFERENCE TO RELATED APPLICATIONS/INCORPORATION BY REFERENCE

This application is a continuation of U.S. patent application Ser. No. 12/509,662 entitled "METHOD AND SYSTEM FOR IMPROVING SPEECH RECOGNITION ACCURACY BY USE OF GEOGRAPHIC INFORMATION", filed Jul. 27, 2009. The complete subject matter of this patent application is hereby incorporated herein by reference, in its entirety.

BACKGROUND

1. Field of the Invention

The present invention relates to speech recognition systems, and, more particularly, to speech recognition systems that are used within a vehicle.

2. Description of the Related Art

In many spoken language interface applications, proper names, such as street names, point of interest (POI) names, and city names, are widely used. It is often the case that the proper names used in these applications are very numerous and/or involve many foreign names, such as street names in a navigation domain or restaurant names in a restaurant selection domain. As may be readily appreciated, foreign names in particular are subject to being mispronounced or pronounced in a variety of ways. Hence, the problems with the recognition of proper names in conventional spoken language interface applications with large name lists include inadequate speech recognition accuracy of these names in the speech recognizer component, and inadequate recognition accuracy of these names with regard to the presence of these names in the system database.

Dialog systems are systems in which a person speaks to a computer or machine, in order to accomplish a result. They are becoming increasingly used to facilitate the man-machine interface in many applications such as computers and automobiles. In many spoken language interface applications, proper names, such as street names, city names, point of interest (POI) names, company names, and so on, are widely used. With data storage capacities in such systems increasing rapidly, people tend to put more and more names into their storage in the form of databases. Accessing the data with spoken language offers people convenience and efficiency if the spoken interface is reliable. It is often the case that the number of proper names used in these applications is very large, and can include many foreign or hard-to-recognize names, such as street names in a navigation domain, or restaurant names in a restaurant selection domain. In general, present recognition methods on large name lists focus strictly on the static aspect of the names. This is a very challenging problem especially for speech recognition because of the confusability in the large name lists.

What is neither disclosed nor suggested in the art is a speech recognition system and method for use in a vehicle that can take advantage of geographic location information available in the vehicle to improve the accuracy with which the system recognizes spoken words.

SUMMARY OF THE INVENTION

The present invention may provide a name model generation and name recognition process for spoken interface applications that improves the speech recognition accuracy of names and partial names. The present invention may utilize the geographic information provided by a global positioning system (GPS) receiver or by the user to improve the recognition of proper names spoken by the user. In particular applications with multimodal interfaces besides spoken language, such as a touch screen, the present invention may utilize geographic information from such other modalities to significantly aid in the recognition process for proper names. The invention may improve the speech recognition accuracy for proper names by using geographic information presented by the user during the interaction with the system through other modalities. The geographic information provided by the GPS and/or the user may be used to construct a weighting hierarchy for proper names in the database so that prioritized name categories at different levels may be used to assist speech recognition. An index for geographic entities such as streets and POIs may be provided to speed up the process of generating the name categories.

The invention comprises, in one form thereof, a method for speech recognition including providing a source of geographical information within a vehicle. The geographical information pertains to a system database which contains information related to geographical entities, a current location of the vehicle, a planned travel route of the vehicle, and/or a map displayed within the vehicle. Words spoken within the vehicle are recognized by use of a speech recognition module. The recognizing is dependent upon the geographical information.

The system may not be limited to two categories of user inputs. Inputs from the user may form several categories.

The invention comprises, in another form thereof, a method for speech recognition, including automatically providing a first category of geographical information by the system or a GPS device. A second category of geographical information is derived from inputs provided by the user orally and/or manually via a user interface. A plurality of candidate words are extracted from the geographical information. First ones of the candidate words are extracted from the first category of geographical information. Second ones of the candidate words are extracted from the second category of geographical information. Words spoken within the vehicle are recognized by use of a speech recognition module. The recognizing includes selecting at least one word from the candidate words. The second candidate words are given more weight in the selecting than are the first candidate words.

The invention comprises, in yet another form thereof, a method for speech recognition, including displaying within a vehicle a map of a first geographical area. The first geographical area may be changed by the user by moving or zooming the map. Geographical information is derived from a second geographical area manually defined by a user on a touch screen on which the map is displayed. The second geographical area is a subset of the first geographical area. Words spoken within the vehicle are recognized by use of a speech recognition module. The recognizing is dependent upon the geographical information derived from the first and second geographical area.

An advantage of the present invention is that geographical location data that is available within a vehicle may be used to improve the performance of a speech recognition system within the vehicle.

An advantage of the present invention is that the geographical information together with system database information and active information of the system may form a set of hierarchical name categories with different weights to improve the performance of a speech recognition system.

Another advantage is that the geographical location data may be provided by an automatic system, such as a GPS receiver, or by the human user of the speech recognition system.

Yet another advantage is that the focus of the speech recognition unit may be narrowed down to selected relatively short lists, thereby greatly reducing the misrecognition of names that results from large lists.

BRIEF DESCRIPTION OF THE DRAWINGS

The above mentioned and other features and objects of this invention, and the manner of attaining them, will become more apparent and the invention itself will be better understood by reference to the following description of an embodiment of the invention taken in conjunction with the accompanying drawings, wherein:

FIG. 2 is a flow chart of a speech recognition method according to one embodiment of the present invention.

Figure 1:
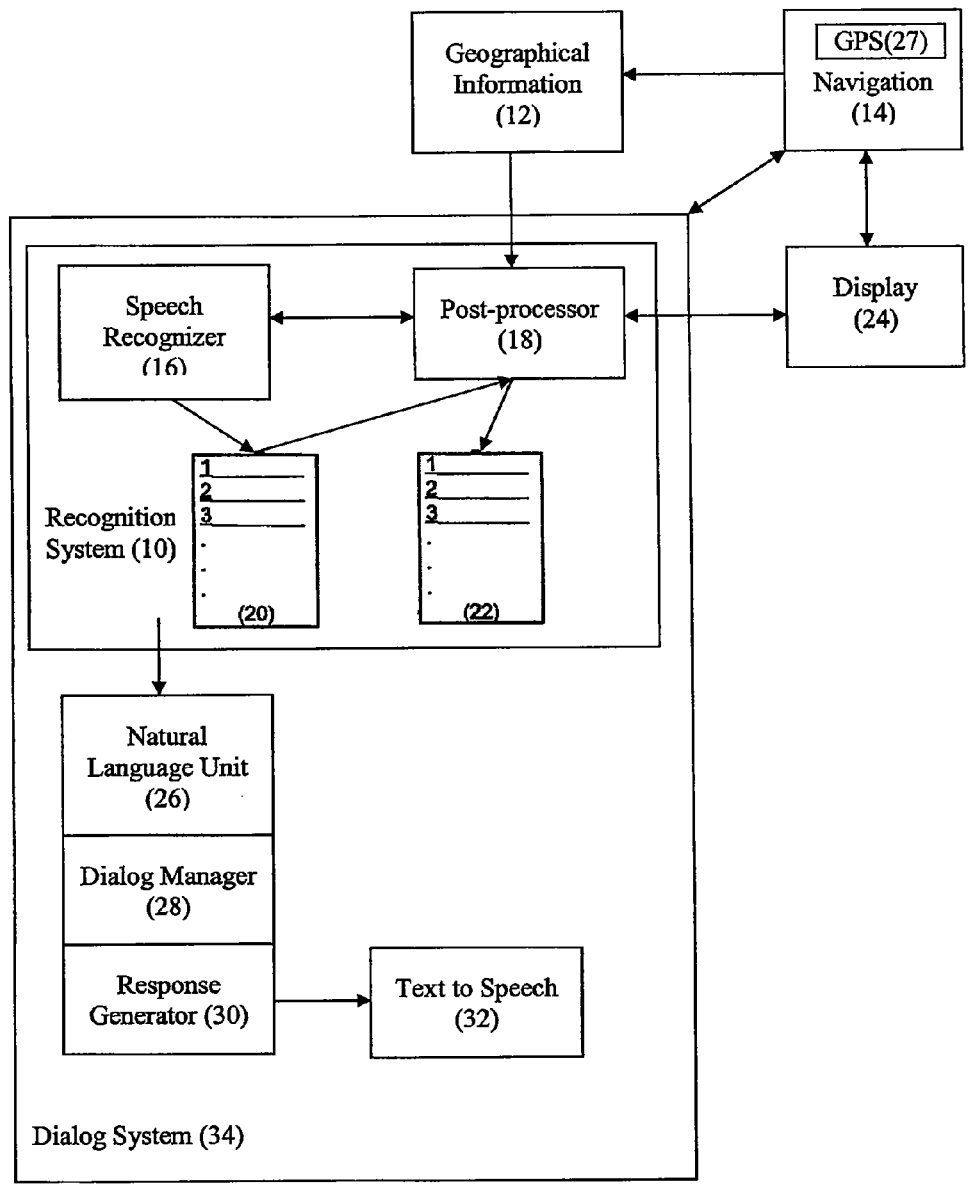
FIG. 1 is a block diagram of one embodiment of a speech recognition system of the present invention.

Corresponding reference characters indicate corresponding parts throughout the several views. Although the drawings represent embodiments of the present invention, the drawings are not necessarily to scale and certain features may be exaggerated in order to better illustrate and explain the present invention. Although the exemplification set out herein illustrates embodiments of the invention, in several forms, the embodiments disclosed below are not intended to be exhaustive or to be construed as limiting the scope of the invention to the precise forms disclosed.

DETAILED DESCRIPTION

The embodiments hereinafter disclosed are not intended to be exhaustive or limit the invention to the precise forms disclosed in the following description. Rather the embodiments are chosen and described so that others skilled in the art may utilize its teachings.

The present invention may provide a system that, for applications with multimodal interfaces besides natural language, may enable information from another multimodality to be leveraged to assist the recognition process. More specifically, in a navigation system with touch screen, geographic information can be utilized to generate hierarchical prioritized name categories to narrow down the search space of proper name recognition. In other words, proper names in different categories may be assigned, or attached with, different weighting values. Names in a category that have a higher weighting value than other names may receive more attention in speech recognition, or may otherwise be more likely to be selected as a candidate interpretation of the name as spoken. The geographic information can be received or derived from, among other sources, the current system display (e.g., the segment of the map currently displayed); a predetermined or variable area surrounding the vehicle's current location, as determined by a GPS receiver; and/or user gestures (e.g., a circle drawn by touch by the user on the touch screen).

The geographic information can be received or derived from a predetermined area of fixed size. However, in another embodiment, the size of the area surrounding the vehicle's current location, from which geographic information may be received or derived, may vary, for example, with the density of POIs and/or nearby streets in the area (i.e., with the number of POIs and/or nearby streets per unit area). For example, a predetermined number of POIs, streets, or other proper names surrounding, and closest to, the vehicle may be provided with relatively high weightings on the list. The predetermined number of POIs, streets, or other proper names may be provided with the relatively high weightings regardless of the distances from the POIs, streets, or other proper names to the vehicle.

One embodiment of a dialog system 34 with a navigation application is illustrated in FIG. 1. The dialog system 34 may include a speech recognizer (SR) unit 16, a speech Post-processor unit 18, a natural language understanding (NLU) unit 26, and a dialog manager (DM) unit 28 including a Response Generator (RG) unit 30. The speech recognizer 16 may receive speech input in the form of acoustic signals at one or more inputs, which can come from one or more users (human speakers) in the form of user utterances. The speech recognizer 16 and the post-processor 18 may comprise the recognition system 10. The natural language understanding unit 26 may be coupled to the recognition system 10 and may receive a sequence or lattice of words with attached labels, such as confidence scores. The NLU unit 26 may output a structured meaning representation, which may use class-based grammars and/or class-based statistical models trained on in-domain and/or domain-independent linguistic data and one or more available knowledge bases. Optimized output may be provided from the natural language unit 26 to the dialog manager unit 28. The DM unit 28 may maintain a list of names mentioned in conversation from both the user and the system, interpret the input representations in context, and issue appropriate instructions to other modules of the dialog system or the navigation application 14 based on the context.

One embodiment of a speech recognition system 10 of the present invention employing geographic information 12 from a navigation system 14 is illustrated in FIG. 1. Navigation system 14 may provide geographic information 12 in the form of a list of POIs, streets, or other proper names that are currently closest to system 10. System 10 may be installed in a vehicle, and thus geographic information may change as the vehicle travels. The list of POIs, streets, or other proper names in geographic information 12 may be provided in order of closeness or proximity to system 10. It is also possible for information 12 to include numerical distances between each item on the list and system 10.

Display 24 may include a touch screen (e.g., a screen that is sensitive to the heat, pressure, and/or optical light-blocking qualities of touch) and may also provide geographic information which is related to gestures marked by a user on a map on Display 24. Possible gestures may include a circle, a line, or a point. The geographic information 12 may be in the form of a list of POIs, streets or other proper names which are enclosed by the gestures or close to the gestures marked by a user. The geographic information 12 may be updated when user gestures on Display 24 are changed. POIs, streets, or other proper names that are enclosed by, and/or close to the gestures may be provided with relatively high weightings as compared to other POIs, streets, or other proper names in the database.

A speech recognition module 16 may receive audible spoken inputs from a human user. Module 16 may convert the spoken inputs into strings of alphanumeric characters. The alphanumeric characters may be provided in binary form or any other form that is suitable for processing. The alphanumeric characters may be indicative of the pronunciation of the spoken inputs as provided by the user. The strings of characters may be used by Module 16 to create a list 20 of preliminary candidate interpretations. The preliminary candidate interpretations on list 20 may be provided in an order based on decreasing similarity of pronunciation with the character string.

The preliminary candidate interpretations on list 20 may match, or be similar to, POIs, streets, or other proper names provided in geographic information 12. List 20 may be reordered by Post-processor 18 to give greater weighting to those preliminary candidate interpretations that match, or are similar to, POIs, streets, or other proper names provided in geographic information 12. The weightings given to preliminary candidate interpretations based on matching or similarity to geographic information 12 versus the weightings given to preliminary candidate interpretations based on similarity in pronunciation to the character strings provided by module 16 may vary. Based on these weightings, candidate list 20 may be reordered and/or shortened to produce a list 22 of final candidate interpretations that may be presented to the user on display 24. List 22 may provide the final candidate interpretations in order of decreasing likelihood of matching the user's intended interpretation of his spoken input. This likelihood of matching the user's intended interpretation may be based upon the above-described weightings. Display 24 may be touch-sensitive and may be used by navigation system 14 to display maps and other navigation information to the user. The user may then indicate orally or via the touch screen which of the final candidate interpretations on list 22 matches the user's intended interpretation of his spoken input. In another embodiment not including user selection, system 10 may take the top N number of candidate words with respect to weighting or confidence on list 22 and forward the N candidate words to NLU unit 26 for further processing.

It is possible that post-processor 18 does not reorder every list 20 from Module 16 by using geographical information 12. Rather, it is possible that only lists for concrete proper names such as POIs or streets may be reordered by post-processor 18. It is possible that lists for generic names are not reordered by post-processor 18. For example, if the user asks "Is there a Chinese restaurant in this area?" and marks a circle on the map, the geographical information extracted from the circle gesture may not be used to reorder the list 20 for the generic proper name "Chinese restaurant". Another example is the user asking "Is Taco Bell in this area?" and a circle is marked on the map by the user. Since the possibility of the POI (Taco Bell) being in the specified area is unclear, the geographical information extracted from the circle gesture may not be used to reorder the list 20 for the restaurant name "Taco Bell". On the other hand, if the user says "Plan a route to Miranda Ave near here", and marks a point on the map, the street names extracted from the surrounding area of the point may be used to reorder the list 20 for the street name "Miranda Ave".

Navigation system 14 may include a GPS receiver 27 that ascertains and updates the current global geographical coordinates of system 10. However, it is within the scope of the invention for system to use other techniques to determine its global location, such as via triangulation with cellular telephone towers.

Any weighting scheme that may be used to produce list 22 may be within the scope of the present invention. Moreover, the present invention may not be limited specifically to the use of weightings. Rather, the invention may encompass any algorithm or method that provides at least one interpretation of spoken input, wherein the interpretation is dependent upon, or based upon, geographical information provided by any available source of such information.

In one specific embodiment of a navigation system with multimodal interfaces including natural language and touch screen, four levels of categories may be identified with priorities in increasing order. That is, the fourth category may be highest priority; the third category may be second highest priority; the second category may be third highest priority; and the first category may be lowest priority. The first category may include a static background database that contains all possible proper names such as street names and POI names.

The second category may include proper names related to geographic entities (e.g., street, POI) contained in the map area that is displayed. For example, if the current map displayed on the screen is of a certain part of a city, then street names and POI names in this area of the city which is visible to the user are put in the second category. These street names and POI names which are in the displayed area of the city may be provided with a higher weighting than are the street names and POI names that are not in this displayed area. A reason that such increased weighting of displayed areas may be advantageous may be that the user is more likely to speak names that are in the current focus, and thus the higher weighting may result in more accurate final candidate interpretations.

The third category may include proper names related to geographic entities contained in areas of a map that are indicated by user gestures. For example, the user may "draw" a circle or a point on the map by touching the touch screen. The user may draw such a circle or a point because he wants the navigation system to calculate a route to a POI within the circle or near the point. In order to facilitate the recognition of the name of the POI by the processor, all names of POIs in this circle or near the point may be put in the third category and have a higher priority than POIs not in this circle or far from the point. This category may include only a limited number of POIs that are associated with the user gesture.

The fourth and last category may include proper names in an active list which could be a list of POIs which have been recently retrieved from the database and are being displayed, have been recently displayed, and/or have been audibly spoken by the system to the user. For example, the user may want to find restaurants in a certain geographic area, and may orally request a list of such restaurants. A list of ten restaurants in the area may be shown to the user in the form of text characters on a monitor or display screen. These ten restaurants, by virtue of being displayed to the user, may be included in the active list. These restaurant names, which may be provided in response to user input, may thus be included in the fourth category that has the highest priority. Thus, the four categories may make up a weighting hierarchy for the proper names in the database.

It is possible that the user may query properties of the POIs in the active list, such as the type of cuisine served by a restaurant. In one embodiment, these POIs, street names or other proper names that have had their properties queried or otherwise mentioned by the user may be placed in a fifth category of the highest priority, and thus may be assigned increased weightings. It is possible for these weightings of proper names of the fifth category to decrease with the length of time that has passed since the user orally referred to the particular proper name. As already mentioned with regard to other embodiments, a higher weighting may improve the ranking of a proper name in the list of final candidate interpretations.

The first name category as described above with the lowest priority may be a static list containing all proper names in the database, while the other categories may be generated dynamically at run time based on the current system context.

When the map is shifted, moved or zoomed in/out by the user, the system may re-determine the proper names (e.g., street names, POI names) that are contained in the modified map and update the second name category. When the user uses a finger to draw a demarcation or other marking on the touch screen which may include, but is not limited to, a circle, a point or a line, proper names related to these markings may be given a higher priority and stored in the third name category. If the drawing is a circle, for example, proper names of entities enclosed in the circle may be given a higher weight. If the drawing is a point, proper names of entities near this point (e.g., within a certain radius) may be given a higher weight. Further, proper names of entities that are closer to the point than other points within the circle may be given higher weights than the proper names of the other farther points. If the drawing is a line, proper names of entities within the bounding box of this line may have a higher weight. Active proper names, which are names recently mentioned or related to a current search/query result that has been returned back to the user, may have the highest priority. With this priority hierarchy, the present invention may provide increased accuracy for large name lists in speech recognition, language understanding, and other components in dialog systems, due to the weightings that give higher rankings to the names that are more likely to be currently or recently spoken by the user.

The second and third categories may be generated based on geographic information provided within the system (e.g., a map that is displayed) and information provided by the user (e.g., hand gestures that create drawings on a touch screen on which a map is displayed). Proper names related to this geographic information and user-provided information may be identified so that proper weights can be assigned to them. To speed up the process of identifying related proper names, geographical information in the form of an index may be constructed for the geographic entities (e.g., street, POI) whose names may need to be recognized. For example, given a geographical area, the index can return the proper names of the geographic entities within this area. As one example, if the user draws a circle on the map, the geographical area is identified by the circle and the index may be consulted to get the names of streets and POIs within this circle.

The index may have a tree structure. Each leaf node may correspond to a relatively small geographic region and may have references to all the geographic entities (e.g., streets, POIs) within this region. Geographic regions in leaf nodes may not overlap with each other, but it is possible for such overlap to exist within the scope of the invention. With regard to internal nodes in the tree, an internal node may be a bounding box for the regions of this node's child nodes. In other words, an internal node may be the smallest region that covers all the regions of its child nodes. Each of the regions that are at least partially overlapped by a pattern manually created by the user on the touch screen may be included in a geographical area on the map considered to be marked or indicated by the user as being of interest.

In one embodiment, the index may be a full quadtree. A quadtree is a tree data structure in which each internal node has up to four children. Given a geographic region (e.g., a city), the index may be built up as follows. The root of tree is the whole region. For each node at a certain level, the region may be evenly divided into four regions which are the four children of that node. The granularity of the leaf nodes may depend on the depth of the tree. Given a query of a geographic region (e.g., a circle drawn by the user), in order to find all the geographic entities in this region, the index may be searched to find all the leaf nodes that overlap with the query region.

Proper names in the leaf nodes may be merged to construct the prioritized name category.

The present invention as described above includes several advantages over the prior art. Previous speech recognition methods on large name lists strictly focus on the static aspect of the names. The present invention, in contrast, may use geographic information from other modalities to construct a weighted name hierarchy that increases the recognition accuracy. A search index may be used to speed up the generation of prioritized name categories.

Spoken language is the most natural and convenient communication tool for human beings. With data storage capacity increasing rapidly, people tend to put more and more names into their storage in the form of database. Accessing the data with spoken language offers people convenience and efficiency if the spoken interface is reliable. The method of the invention may provide a highly reliable technique that may be especially applicable for use in the automotive industry, wherein drivers' are in an eye-busy and hand-busy situation.

The present invention may leverage geographic information to increase the recognition accuracy with large name lists. The geographic information may come from GPS devices, modalities other than speech recognition, and may be derived from user gestures and the current geographical area displayed by a navigation system. The geographic information, the static database, and the dynamic active list may be used to establish a set of hierarchical name categories with different priorities in order to facilitate speech recognition. A search index may be used to speed up the generation of prioritized name categories.

The present invention may include several novel features, including: the use of geographic information from other modalities to increase the accuracy of name recognition; a set of hierarchical name categories with different weight values for use in speech recognition; geographic information derived from a visible display map and from user gestures; and a search index to speed up the generation of prioritized name categories.

One embodiment of a method 200 of the present invention for speech recognition is illustrated in FIG. 2. In a first step 202, a source of geographical information is provided within a vehicle. The geographical information pertains to a current location of the vehicle, a planned travel route of the vehicle, and/or a map displayed within the vehicle. For example, as in the embodiment of FIG. 1, navigation system 14 may provide geographical information 12 which may include a current geographical location of a vehicle in which system 10 is installed; a map displayed on display 24; and/or a planned route of the vehicle that a user has programmed into navigation system 14.

In a next step 204, words spoken within the vehicle are recognized by use of a speech recognition module. The recognizing is dependent upon the geographical information. In the example illustrated in FIG. 1, words spoken within a vehicle in which system 10 is installed are recognized by use of speech recognition module 16. The speech recognition process may also involve processor 18 using the output of module 16 to produce a preliminary list 20 of candidate interpretations, and modifying list 20 based on geographical information 12 to thereby produce list 22 of final candidate interpretations. For example, processor 18 may decide that a lower ranked candidate interpretation on list 20 is more likely to be correct than is a higher ranked candidate interpretation based the lower ranked candidate interpretation being present in geographical information 12 and the higher ranked candidate interpretation not being present in geographical information 12. Thus, processor 18 may flip flop the rankings of the two candidate interpretations such that the one that is lower ranked on list 20 is the higher ranked of the two on list 22.

In one embodiment, geographical information provided by the user may be afforded more weight in the recognizing algorithm than is geographical information automatically produced by the system. For example geographical information pertaining to a planned travel route of the vehicle, which may be based on user inputs, may be afforded more weight in the recognizing algorithm than are a current location of the vehicle or a map displayed within the vehicle. Thus, the recognizing process may be biased to a greater degree toward interpreting the spoken words as a selected candidate interpretation that is extracted from geographical information pertaining to the planned travel route of the vehicle than toward interpreting the spoken words as a selected candidate interpretation that is extracted from geographical information pertaining to the current location of the vehicle or to a map displayed within the vehicle.

Figure 3:
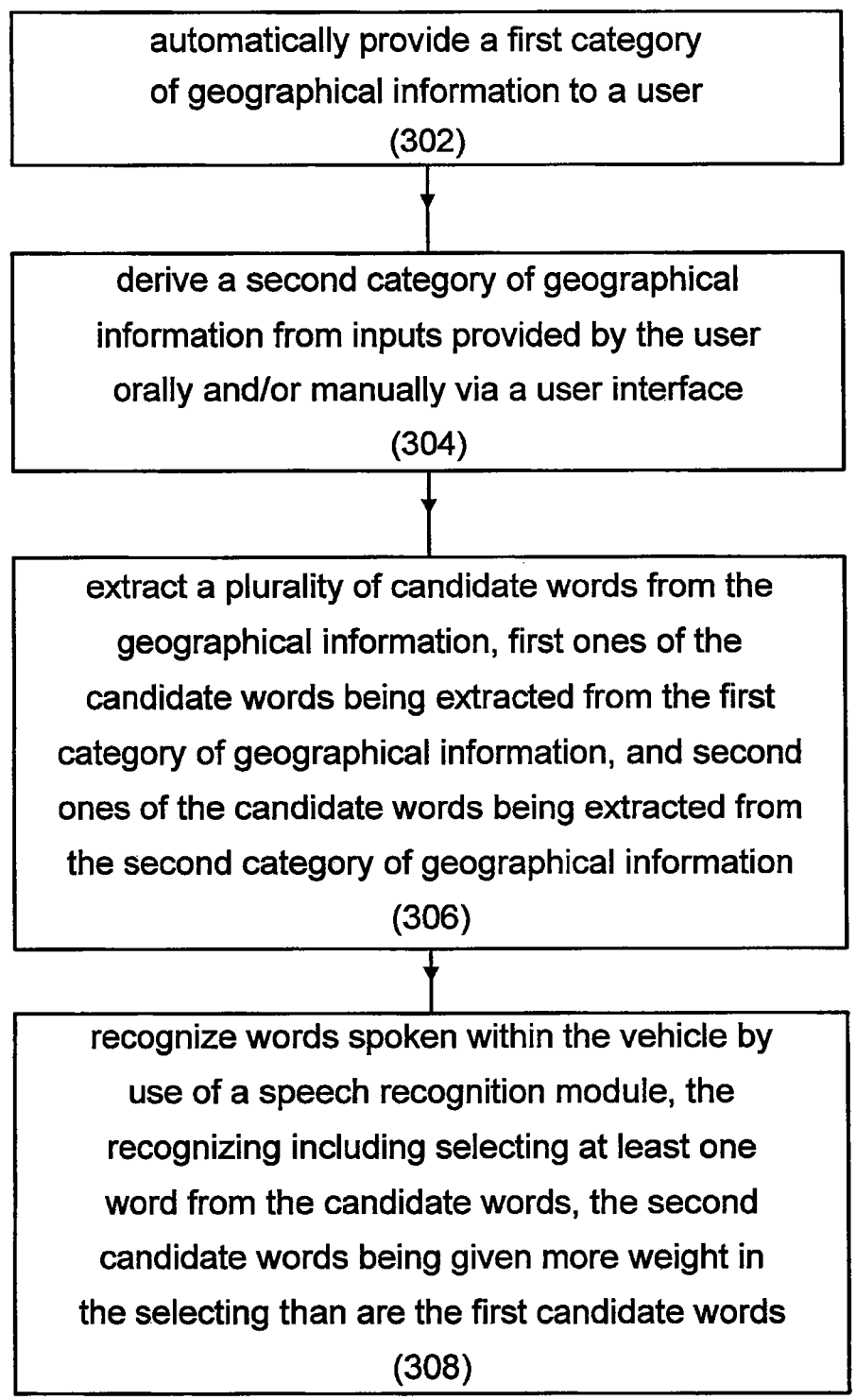
FIG. 3 is a flow chart of a speech recognition method according to another embodiment of the present invention.

Another embodiment of a method 300 of the present invention for speech recognition is illustrated in FIG. 3. In a first step 302, a first category of geographical information is automatically provided by the system to a user. For example, referring to the system 10 of FIG. 1, navigation system 14 may provide geographical information in the form of a map automatically displayed and updated on display 24 and showing the geographical area or neighborhood surrounding system 10.

In a next step 304, a second category of geographical information is derived from inputs provided by the user orally and/or manually via a user interface. In the example illustrated in FIG. 1, a user may speak a phrase including a command (e.g., "plot a route to") followed by the name of a POI or street to which he would like to plot a route. Alternatively, or in addition, the user may use his finger to draw a circle on a touch screen map display, wherein the entity that he wants to go to is inside the circle. Of course the user will not likely be able to draw a perfect circle on the map, and the "drawing" may not even be a closed loop (i.e., may be C-shaped). However, processor 18 may model the drawing as a circle, or may use the actual drawing and modify it by closing the loop. Geographic entities contained in the user's drawing (or modeled/modified drawing) may be placed in the second category of geographical information to facilitate the recognition of the words spoken by the user.

Next, in step 306, a plurality of candidate words are extracted from the geographical information. First ones of the candidate words are extracted from the first category of geographical information, and second ones of the candidate words are extracted from the second category of geographical information. For example, the first candidate words may be in the form of proper names of POIs and streets that are extracted from and that are within the map that is automatically displayed on display 24. The second candidate words may be in the form of the names of entities extracted from the names of POIs and streets that are within the drawn circle on the map.

In a final step 308, words spoken within the vehicle are recognized by use of a speech recognition module. The recognizing includes selecting at least one word from the candidate words. The second candidate words are given more weight in the selecting than are the first candidate words. For example, speech recognition module 16 may be used in recognizing speech within the vehicle in which system 10 is installed. The speech recognition may also involve processor 18 creating a preliminary list 20 of candidate words that sound like the phonetic output of module 16. The preliminary candidate words on list 20 may be listed in order of phonetic similarity to the output of module 16. Processor 18 may then modify and/or re-rank list 20 based on the first and second candidate words to thereby arrive at the final list 22 of candidate words. For example, if one of the candidate words on list 20 is also included in the first and/or second candidate words, then that candidate word may be moved up in the rankings on final list 22 as compared to preliminary list 20. If the word is in the second candidate words, then it may move farther up the rankings on final list 22 than if it were in the first candidate words. Moreover, being in both the first and second candidate words may cause a word on list 20 to be higher ranked on list 22 than if it were only in the second candidate words. A word may move farther still up the rankings on list 22 base on being included multiple times in the geographical information. Some limited number (perhaps only one) of top-ranked final candidate words on list 22 may be presented to the user on display 24 for the user to verify or select which word he intended to convey. It is also possible that system 10 may simply go ahead with further processing of navigation system 14 based on automatic selection of the top ranked final candidate word on list 22.

Figure 4:
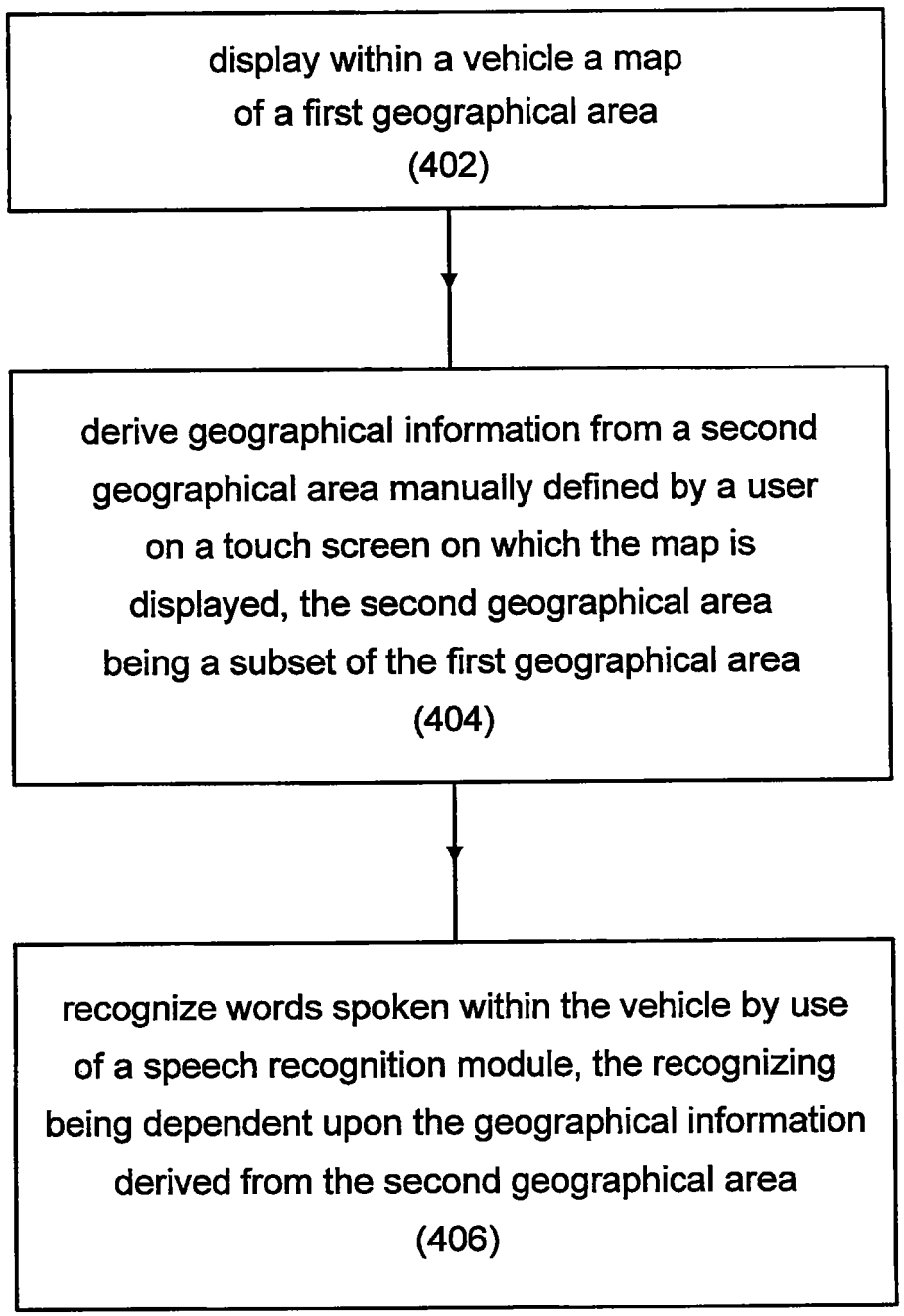
FIG. 4 is a flow chart of a speech recognition method according to yet another embodiment of the present invention.

Yet another embodiment of a method 400 of the present invention for speech recognition is illustrated in FIG. 4. In a first step 402, a map of a first geographical area is displayed within a vehicle. For example, in the embodiment illustrated in FIG. 1, a map of a city, for instance, may be displayed on a screen of display 24 inside a vehicle.

In a next step 404, geographical information is derived from a second geographical area manually defined by a user on a touch screen on which the map is displayed. The second geographical area is a subset of the first geographical area. In the example illustrated in FIG. 1, a user may finger-draw a line, point or at least semi-closed loop that delineates or otherwise indicates a geographical area or point that is within the map displayed on the touch screen of display 24.

In a final step 406, words spoken within the vehicle are recognized by use of a speech recognition module. The recognizing is dependent upon the geographical information derived from the second geographical area. For example, the user may speak the name of a geographical entity that he would like displayed on the map. Speech recognition module 16 may convert the audible inputs into alphanumeric characters indicative of the sounds uttered by the user. Processor 18 or navigation system 14 may extract from display 24 all of the entity names that are within the section of the map that the user manually marked. A search index having a tree structure may be used to facilitate the identification of the entity names that are within the marked section of the map. If any of these extracted entity names are similar in pronunciation to the name spoken by the user, then that extracted entity name is given a higher ranking in a list of candidate names than it would have been given if it were not among the extracted entity names. Thus, the recognizing process may be biased toward interpreting the words spoken as being one of the candidate interpretations extracted from the geographical information. The recognizing process may include providing several top-ranked candidate names to the user so that he can pick one that matches the entity that he earlier spoke. The recognizing process may include assuming that the single top-ranked candidate name is the one that the user earlier spoke.

The number of final candidate names presented to the user may depend on a degree of confidence that processor 18 has in the top-ranked final candidate names. For example, processor 18 may display to the user only the top-ranked final candidate name(s) whose sum total probability of matching the user's intended interpretation exceeds some threshold probability, such as 95 percent, for example. For instance, if processor 18 believes that there is a 60 percent chance that the highest ranked final candidate name matches what the user said, and there is a 37 percent chance that the second-highest ranked final candidate name matches what the user said, then only those two final candidate names are present to the user for him to indicate which of the two actually does match what he said.

While this invention has been described as having an exemplary design, the present invention may be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains.

What is claimed is:

1. A method for speech recognition, the method comprising the steps of:
    providing a source of geographical information within a vehicle, the geographical information pertaining to at least one of:
        a current location of the vehicle;
        a planned travel route of the vehicle; and
        a map displayed within the vehicle;
    recognizing words spoken within the vehicle by use of a speech recognition module, the recognizing being dependent upon the geographical information; and
    extracting a plurality of candidate interpretations from the geographical information, the recognizing being biased to a greater degree toward interpreting one of the spoken words to be a selected said candidate interpretation extracted from geographical information pertaining to the planned travel route of the vehicle than toward interpreting one of the spoken words to be a selected said candidate interpretation extracted from geographical information pertaining to one of the current location of the vehicle and a map displayed within the vehicle.

2. The method of claim 1 wherein the source of geographical information comprises a navigation system.

3. The method of claim 1 wherein at least one of the candidate interpretations is a name of an entity associated with said at least one of:
    a current location of the vehicle;
    a planned travel route of the vehicle; and
    a map displayed within the vehicle.

4. The method of claim 1 wherein the geographical information pertains to a subset of the displayed map, the subset being manually marked by a user.

5. The method of claim 4 wherein the subset comprises an area marked by the user on a touch screen display, a boundary of the area being modeled as a closed loop, a point or a line.

6. A method for speech recognition, the method comprising the steps of:
    automatically providing a first category of geographical information to a user;
    deriving a second category of geographical information from inputs provided by the user at least one of orally and manually via a user interface;
    extracting a plurality of candidate words from the geographical information, first ones of the candidate words being extracted from the first category of geographical information, and second ones of the candidate words being extracted from the second category of geographical information; and
    recognizing words spoken within the vehicle by use of a speech recognition module, the words being spoken after the inputs have been provided by the user, the recognizing including selecting at least one word from the candidate words, the second candidate words being given more weight in the selecting than are the first candidate words.

7. The method of claim 6 wherein the first category of geographical information is automatically provided by a navigation system.

8. The method of claim 6 wherein the second category of geographical information is derived from at least one navigation command orally provided by the user.

9. The method of claim 6 wherein the second category of geographical information is derived from an area of a map displayed in the vehicle, the map area being manually marked by the user.

10. The method of claim 9 comprising the further steps of:
    dividing the map into a plurality of sections; and
    creating an index associating each of the sections with names of entities with the section, the extracting of the second candidate words including using the index to identify all of the entity names associated with each of the sections that are at least partially overlapped by the manually marked area of the map.

11. The method of claim 6 wherein the candidate words consist essentially of candidate entity names.

12. The method of claim 6 comprising the further step of using a speech recognition module to create a list of preliminary candidate words, the list of preliminary candidate words being created independent of the geographical information, the first candidate words being given more weight in the selecting than are the preliminary candidate words that are identified independent of the geographical information.

13. The method of claim 6 wherein the second category of geographical information is derived from a first input spoken by the user and a second input spoken by the user, the first input being spoken by the user before the second input is spoken by the user, a first one of the second candidate words being extracted from said second geographical information derived from the first spoken input provided by the user, a second one of the second candidate words being extracted from said second geographical information derived from the second spoken input provided by the user, the second one of the second candidate words being given greater weighting in the recognizing than is the first one of the second candidate words.

14. A method for speech recognition, the method comprising the steps of:
    displaying within a vehicle a map of a first geographical area;
    deriving geographical information from a second geographical area manually defined by a user on a touch screen on which the map is displayed, the second geographical area being a subset of the first geographical area; and
    recognizing words spoken within the vehicle by use of a speech recognition module, the recognizing being dependent upon the geographical information derived from the second geographical area.

15. The method of claim 14 comprising the further step of deriving first geographical information from the first geographical area, the geographical information derived from the second geographical area comprising second geographical information, wherein at least one portion of the first geographical information is omitted from the second geographical information, the second geographical information being given greater weighting in the recognizing than is the first geographical information.

16. The method of claim 14 wherein the second geographical area is defined by a user touching a portion of the touch screen overlapping the map, the user touching the screen in a pattern modeled by a processor as a defining the second geographical area.

17. The method of claim 16 wherein the map is divided into a plurality of rectangular sections, the second geographical area comprising each said section that is at least partially overlapped by the pattern.

18. The method of claim 14 comprising the further steps of:
extracting names of entities within the second geographical area; and
presenting the extracted names to the user as candidate interpretations of the words spoken.

19. The method of claim 18 wherein the recognizing is biased toward interpreting the words spoken as at least one of the extracted names.

20. The method of claim 14 comprising the further step of extracting a predetermined number of names of entities within the second geographical area, wherein the second geographical information comprises the predetermined number of extracted names.

* * * * *